United States Patent
Komatsu

(10) Patent No.: US 9,071,803 B2
(45) Date of Patent: Jun. 30, 2015

(54) IMAGE PROCESSING APPARATUS, IMAGE PICKUP APPARATUS, IMAGE PROCESSING METHOD AND NON-TRANSITORY COMPUTER-READABLE STORAGE MEDIUM STORING IMAGE PROCESSING PROGRAM

(71) Applicant: CANON KABUSHIKI KAISHA, Tokyo (JP)

(72) Inventor: Satoru Komatsu, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/311,884

(22) Filed: Jun. 23, 2014

(65) Prior Publication Data

US 2014/0375849 A1 Dec. 25, 2014

(30) Foreign Application Priority Data

Jun. 25, 2013 (JP) ................... 2013-132660

(51) Int. Cl.
  *G06K 9/00* (2006.01)
  *H04N 9/64* (2006.01)
  *G06T 5/00* (2006.01)

(52) U.S. Cl.
  CPC ............ *H04N 9/646* (2013.01); *G06T 5/003* (2013.01); *H04N 9/643* (2013.01); *G06T 2207/10024* (2013.01)

(58) Field of Classification Search
  USPC .......... 382/167, 162, 260, 255, 263; 348/242, 348/222.1, 241, 597
  See application file for complete search history.

(56) References Cited

U.S. PATENT DOCUMENTS 7,474,797 B2 * 1/2009 Bezryadin ............... 382/260
8,175,383 B2 * 5/2012 Shiraishi ............... 382/167

FOREIGN PATENT DOCUMENTS

JP 2008-147980 A 6/2008
JP 2008-147981 A 6/2008

* cited by examiner

*Primary Examiner* — Anh Do
(74) *Attorney, Agent, or Firm* — Rossi, Kimms & McDowell LLP

(57) ABSTRACT

The image processing apparatus includes an estimator configured to estimate an amount of a color blur of each of multiple color components included in a color image, and a processor configured to perform a color blur reduction process to reduce, from the color image, the color blur of each color component by using the estimated amount of the color blur thereof. The apparatus further includes a decider configured to acquire a hue formed by the color blurs of the color components and to decide, depending on the hue, an order of the color components on which the color blur reduction processes are performed.

7 Claims, 7 Drawing Sheets

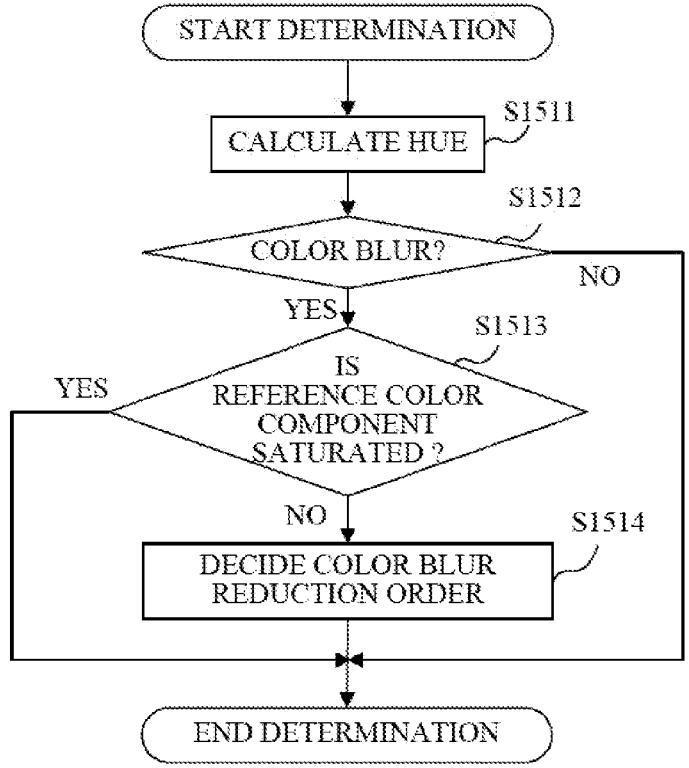
FIG. 7
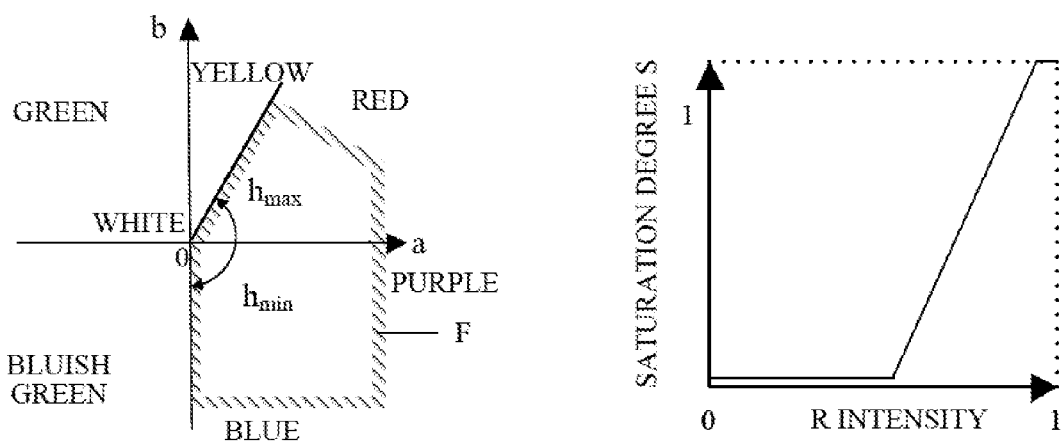
FIG. 8
FIG. 9

IMAGE PROCESSING APPARATUS, IMAGE PICKUP APPARATUS, IMAGE PROCESSING METHOD AND NON-TRANSITORY COMPUTER-READABLE STORAGE MEDIUM STORING IMAGE PROCESSING PROGRAM

BACKGROUND OF THE INVENTION

1. Field of the Invention

The present invention relates to an image processing technology of reducing color blur included in a color image obtained by image capturing.

2. Description of the Related Art

An image pickup system that produces a color image by image capturing undesirably sometimes generates a color blur, which is an originally nonexistent color, around a bright region in the color image due to chromatic aberration of an imaging optical system (image capturing optical system). Such a color blur is likely to foe generated at wavelengths away from a central wavelength of the imaging optical system. For example, a visible-light image pickup system generates a blue artifact, a red artifact or a purple artifact that is a mixture of the red and blue artifacts in a blurred manner, which are each called a color blur or a purple fringe.

The chromatic aberration can be optically reduced to some extent with a combination of a plurality of lenses having mutually different, dispersions. However, increase of resolution of an image sensor and reduction of size of the imaging optical system in an image pickup apparatus, such as a digital camera, makes it difficult, to optically achieve a sufficient reduction in the chromatic aberration. Thus, reduction in these color blurs is required to be achieved by image processing.

Japanese Patent Laid-open Nos. 2008-147980 and 2008-147981 each disclose an image processing method of estimating an amount of a color blur of each of color components included in an input color image and of subtracting the estimated amounts of the color-blurs from the original color image to reduce the color blurs of the respective color components. Japanese Patent Laid-open Nos. 2008-147980 and 2008-147981 each also disclose a technique of correcting the estimated amounts of the color blurs to avoid excessive subtraction of the color blurs from the color image.

However, in a case of reducing the color blur including multiple color components by the method disclosed in Japanese Patent Laid-open Nos. 2008-147980 and 2008-147981, performing the subtractions of the estimated amounts of the color blurs of the respective color component in a random order (that is, without considering an order of the color components) may cause inversion of a hue and thereby may generate an unnatural color in an image region having a reduced color blur. In other words, a desirable color blur reduction effect may be not achieved.

SUMMARY OF THE INVENTION

The present invention provides an image processing apparatus, an image processing method and a non-transitory storage medium storing an image processing program each capable of sufficiently reduce a color blur including multiple color components without generating a hue inversion.

The present invention provides as an aspect thereof an image processing apparatus including an estimator configured to estimate an amount of a color blur of each of multiple color components included in a color image, a processor configured to perform a color blur reduction process to reduce, from the color image, the color blur of each color component by using the estimated amount of the color blur thereof, and a decider configured to acquire a hue formed by the color blurs of the color components and to decide, depending on the hue, an order of the color components on which the color blur reduction processes are performed.

The present invention provides as another aspect thereof an image pickup apparatus including an image producer configured to produce a color image by image capturing and the above image processing apparatus.

The present invention provides as still another aspect thereof an image processing method. The method includes providing a color image including multiple color components, estimating an amount of a color blur of each of the color components in the color image, performing a color blur reduction process to reduce, from the color image, the color blur of each color component by using the estimated amount of the color blur thereof, acquiring a hue formed by the color blurs of the color components, and deciding, depending on the hue, an order of the color components on which the color blur reduction processes are performed.

The present invention provides as yet still another aspect thereof a non-transitory computer-readable storage medium storing a computer program that causes a computer to perform image processing. The image processing includes providing a color image including multiple color components, estimating an amount of a color blur of each of the color components in the color image, performing a color blur reduction process to reduce, from the color image, the color blur of each color component by using the estimated amount of the color blur thereof, acquiring a hue formed by the color blurs of the color components, and deciding, depending on the hue, an order of the color components on which the color blur reduction processes are performed.

Other aspects of the present invention will become apparent from the following description and the attached drawings.

BRIEF DESCRIPTION OF THE DRAWINGS

FIG. 7 is a flowchart of a process of deciding a color blur reduction order in the color blur reduction process.

FIG. 8 illustrates a chromaticity coordinate system and a color blur reduction target region.

FIG. 9 is a graph illustrating a characteristic of a non-linear transform.

DESCRIPTION OF THE EMBODIMENTS

Exemplary embodiments of the present invention will foe described below in detail with reference to the accompanied drawings.

Embodiment 1

Figure 1:
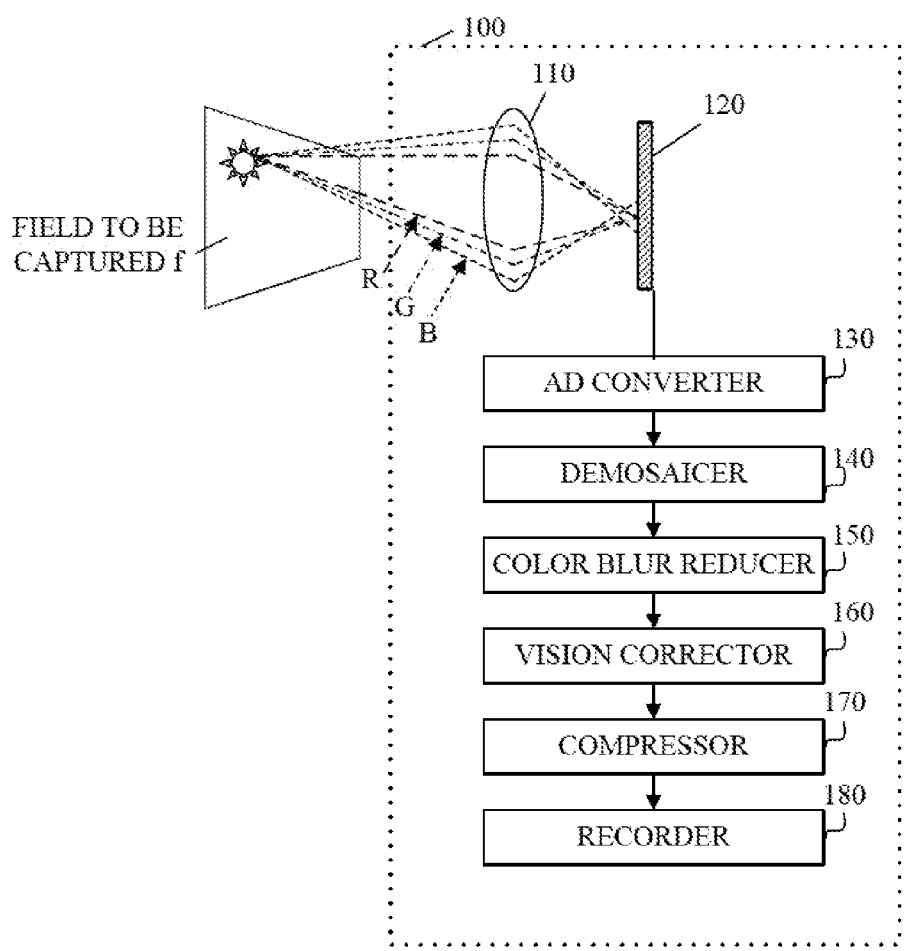
FIG. 1 illustrates a configuration of a color image pickup apparatus provided with an image processing apparatus (and using an image processing method) that is Embodiment 1 of the present invention.

FIG. 1 illustrates a configuration of a color-image pickup apparatus 100 provided with an image processing apparatus (that is, using an image processing method) that is a first embodiment (Embodiment 1) of the present invention. The color-image pickup apparatus 100 includes an imaging optical system (image capturing optical system) 110, an image sensor 120, an AD converter 130, a demosaicer 140, a color blur reducer 150, a vision corrector 160, a compressor 170 and a recorder 180. A field (object) f to be captured and light rays of R (red), G (green) and B (blue) are not constituent elements of the color image pickup apparatus 100, but are illustrated in FIG. 1 for explanation.

The imaging optical system 110 forms an optical image (object image) of the field f on the image sensor 120 constituted by a photoelectric conversion, element such as a CCD sensor or a CMOS sensor. In the present embodiment, the imaging optical system 110 has corrected chromatic aberrations in an R wavelength range, a G wavelength range and a B wavelength range. However, although the chromatic aberration in the G wavelength range is sufficiently corrected, the chromatic aberrations in the R and B wavelength ranges remain as compared to that in the G wavelength range.

Figure 2:
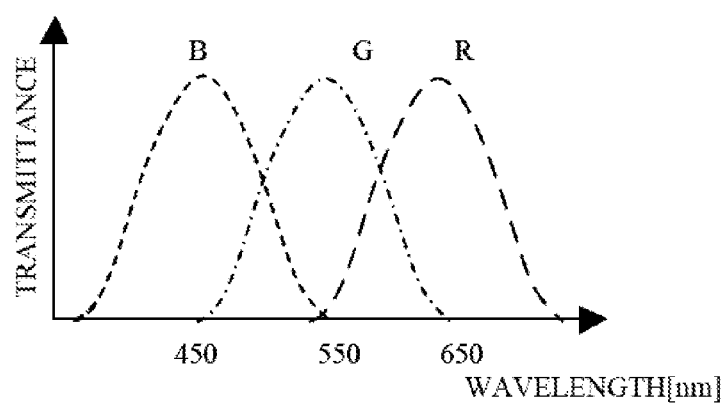
FIG. 2 is a graph illustrating a spectral transmittance of a primary color filter.
Figure 3:
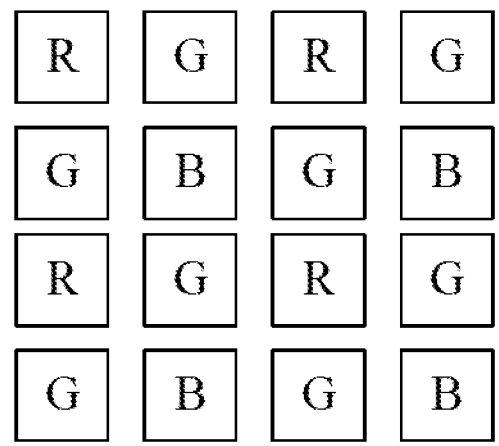
FIG. 3 illustrates an arrangement of color-elements in the primary color filter.

The image sensor 120 is a single-plate color image sensor provided with a typical primary color filter system. As illustrated in FIG. 2, the primary color filter system includes three kinds of color-filters respectively having primary transmission wavelength ranges around 650 nm in the R wavelength range, 550 nm in the G wavelength range and 450 nm in the B wavelength range. Pixels provided with these color filters capture (photoelectrically convert) color components corresponding to the R, G and B wavelength ranges. In the single-plate color image sensor, since the color filters are spatially arranged one by one for each pixel as illustrated in FIG. 3, each pixel can only obtain an intensity of a single color component. This arrangement causes the image sensor to output a color mosaic image.

Although the color filters of the image sensor 120 in the present embodiment are primary color filters of R, G and B, complementary color filters of Ye, Mg, Cy and Gr may be used in place thereof. This configuration provides, through a color conversion process, a color image including the color components R, G and B.

The AD converter 130 converts the color mosaic image output as an analog signal from the image sensor 120 into digital data appropriate for the subsequent image processing.

The demosaicer 140 performs an interpolation process on the color mosaic image as the digital data to produce a color image whose all pixels have RGB color information. The interpolation process may be performed by any method such as a simple linear interpolation or a sophisticated interpolation method. The imaging optical system 110, the image sensor 120, the AD converter 130 and the demosaicer 140 constitute an image pickup system serving as an image producer.

Figure 4:
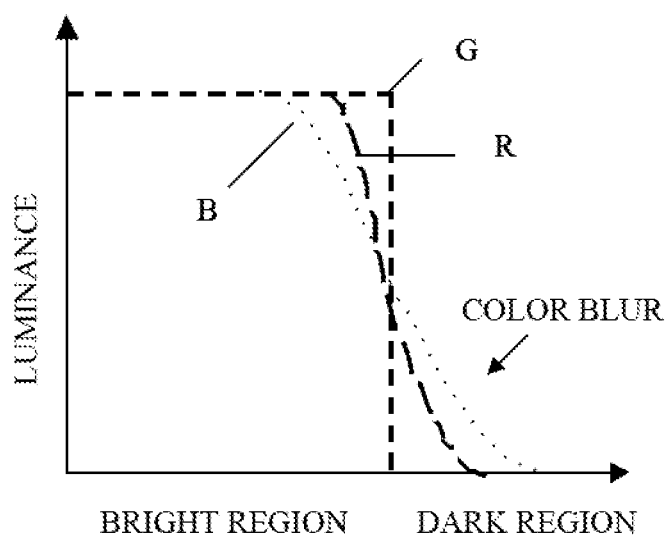
FIG. 4 is a graph illustrating a color blur in purple generated at a boundary between bright and dark regions in a color image.

The color image produced by the demosaicer 140 is an image whose resolutions of the color components of R and B (hereinafter respectively referred to as "an R component" and "a B component") are degraded as compared to that of the color component, of G (hereinafter referred to as "a G component"), due to the above-mentioned chromatic aberrations of the imaging optical system 110. Thus, for example, at a boundary between bright and dark, regions, red and blue are blurred as illustrated in FIG. 4 and thereby, around the bright region, a color blur that is an artifact, like a fringe in red, blue, or purple as a mixture of red and blue. The degrees of blur of the R and B components vary depending on characteristics of the imaging optical system 110, a spectral distribution of a light source in the image and other factors.

The color blur reducer 150 serves as the image processing apparatus (including an estimator, a processor and a decider), performs a spatial calculation on an input image that is the color image produced at the demosaicer 140 to extract a color blur region and estimates an amount of a color blur (hereinafter referred to as "a color blur amount") in the color blur region. The color blur reducer 150 then subtracts a color component amount corresponding to the estimated color blur amount, from the input, image to reduce the color blur. This color blur reduction process will be described in detail later.

The vision corrector 160 performs image correction processes on the color image after the color-blur reduction process to mainly improve visual quality of the color image. The image correction processes include a tone curve (gamma) correction, a chroma enhancement, a hue correction and an edge enhancement.

The compressor 170 performs a compression process by a method such as JPEG on an output image that is the color image output from the vision corrector 160 to reduce a data amount of the color image to an appropriate data amount for recording.

The recorder ISO records the color image after the compression process at the compressor 170 to a recording medium such as a flash memory.

The devices of reference numerals 120 to 180 described above may be configured separately or configured integrally as a single microprocessor.

Figure 5:
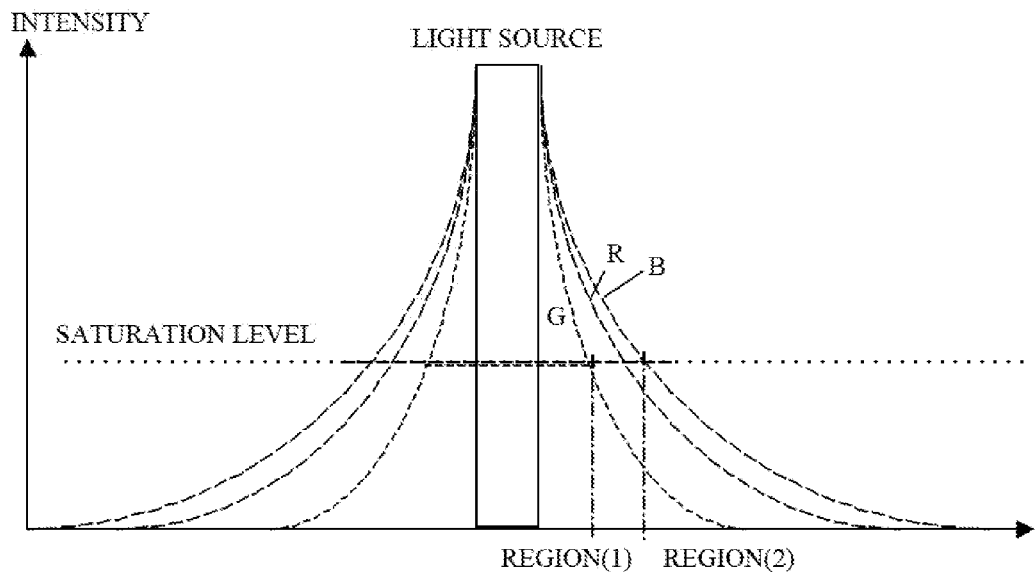
FIG. 5 illustrates a typical color component profile for a high luminance object.

The following describes a color blur that, is a target of the color blur reduction process in the present embodiment. FIG. 5 illustrates a typical example of, in a color image (input image) including R, G and B components as multiple color components, profiles of the R, G and B components for a high luminance object. In FIG. 5, the horizontal axis represents position (for example, horizontal position) in the image, whereas the vertical axis represents intensity (image intensity or pixel value) of each of the R, G and B components. The example illustrated in FIG. 5 includes, in its center, the high luminance object (for example, a light source) whose luminance exceeds a saturation level. This results in spread bottoms of the profiles of the R, G and B components in a region around the high luminance object where its real luminance is low, due to light blurring from the high luminance object because of aberration and flare. The degree of blurring depends on the luminance of the high luminance object and decreases exponentially with the distance from the high luminance object. Although the G component, has some blur (spread of the profile), the blur is smaller than those of the R and B components.

The image sensor 120 is incapable of measuring an intensity exceeding a certain saturation level. Therefore, in an image produced by image capturing with the image sensor 120, saturation of the R, G and B components in a larger region than the high luminance object forms a white luminance saturation region (region (1)). In region (2) distant from the high luminance object than region (1), the G component decays, but a difference in intensity between the G component and the R and 3 components gradually increases because of larger luminance saturation radii of the R and B components than that of the G component. Thus, region (2) has a color changing from white to magenta so as to increase its hue toward outside of this region.

However, after reaching the saturation radii, the R and B components also start decaying, and the difference in intensity between the G component, and the R and B components increases, thereby generating a purple color blur. Only the R and B components thus retain their intensities outside of the bottom of the G component, thereby generating a purple color blur having a higher chroma. The magenta and purple color blurs unnaturally exist, which makes a color in the vicinity of the luminance saturation, region unnatural.

In the present, embodiment, the purple color-blur (purple blur) which is originally nonexistent but is generated by the R and B components, a red color-blur (red blur) and a blue color blur (blue blur) are each a color blur to be reduced. The color blur-reducer 150 reduces (corrects) these unnatural color blurs to produce an output image having natural colors.

Figure 6:
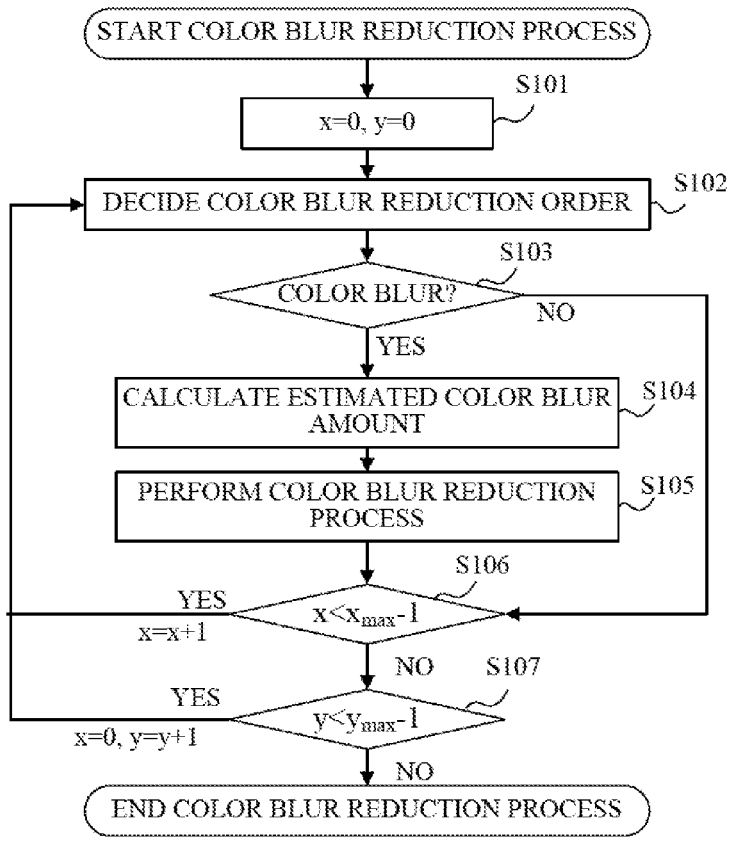
FIG. 6 is a flowchart of a color blur reduction process in Embodiment 1.

Next, description will be made of processes (image processing method) performed by the color blur-reducer 150 with reference to a flowchart illustrated in FIG. 6. The color blur reducer 150 is a computer that executes the following processes according to a computer program (image processing program). At step S101, the color blur reducer 150 acquires a color image from the demosaicer 140 to provide an input image as a process target image. Then, the color blur reducer 150 sets coordinates (x,y) of a first target pixel on which a determination of whether or not the color blur reduction process is performed in the input, image is made to (0,0). Next, at step S102, the color blur reducer 150 decides an order of the color components on which the color blur reduction processes are respectively performed. Next, at step S103, the color blur reducer 150 determines whether or not the target pixel is a color blur pixel having a color peculiar to the color blur. If the target pixel is not the color-blur pixel, the color blur reducer 150 proceeds to step S106. If the target pixel is the color blur pixel, the color blur reducer 150 proceeds to step S104.

At step S104, the color blur reducer 150 calculates, for the color blur pixel, an estimated color blur amount. At this step, the color blur-reducer 150 calculates the estimated color blur amounts for the respective color components on which the color-blur reduction processes (in the present embodiment, the R and B components) are performed. At step S105, the color blur reducer 150 performs, in the order of the color components decided at step S102, the color-blur reduction processes to reduce (desirably, to remove) color blur components in the color blur pixel, by using the estimated color blur amounts calculated at step S104. The color blur reducer 150 stores pixel values (of the R and B components in the present embodiment) after the color blur reduction processes separately to a memory, without overwriting therewith the pixel value of the input image.

Subsequently at step S106 and step S107, the color blur reducer 150 repeats the processes from step S102 to step S105 on all pixels of the input image with different x and y coordinates for the target pixel.

After an output image whose color blur components of the R and B components were reduced and which includes the G component of the input image is obtained, the color blur reducer 150 sends the output image to the vision corrector 160 described above.

The present embodiment assumes that, as described above, the color blur reducer 150 treats the R and B components as targets of the color blur reduction process (hereinafter referred to as "color blur reduction target color components) and uses the G component as a reference color component. With this assumption, detailed description will be made of each of steps S102 to S105 illustrated in FIG. 6. The color-blur reduction target color components may be different from the R and B components.

FIG. 7 illustrates a flowchart of the process performed by the color blur reducer 150 at step S102. The color blur reducer 150 calculates a hue of the target pixel (x,y) at step S1511. The hue is formed by the color blur components (color blurs) of the R and B components at the target pixel, and the hue formed by the color blur components is hereinafter also referred to as "the hue of the color blur". In this calculation of the hue, the color blur reducer 150 first performs calculation of following expression (1) on intensities of the R, G and B components to convert an RGB color system to an XYZ color system:

$$\begin{pmatrix} X \\ Y \\ Z \end{pmatrix} = \begin{pmatrix} 0.41 & 0.36 & 0.18 \\ 0.21 & 0.72 & 0.07 \\ 0.02 & 0.12 & 0.95 \end{pmatrix} \begin{pmatrix} R \\ G \\ B \end{pmatrix} \quad (1)$$

Subsequently, the color blur reducer 150 defines, by using X, Y and Z obtained by expression (1), chromaticity coordinates (a,b) by following expression (2). This chromatidty coordinates (a,b) corresponds to a simplified Lab color system.

$$\begin{cases} a = 5(X - Y) \\ b = 2(Y - Z) \end{cases} \quad (2)$$

Next, the color blur reducer 150 calculates, by using the chromaticity coordinates (a,b) calculated by expression (2), a hue h by following expression (3). Although the present embodiment describes a case of using the chromaticity coordinates (a,b), other coordinates such as an Lab color system or a YUV color system may be used as the chromaticity coordinates.

$$h = \tan^{-1}(b/a) \quad (3)$$

Description will be made of correspondence relation between the chromaticity coordinates (a,b) and the R and B components. FIG. 8 illustrates a plane of the chromaticity coordinates (a,b); the plane is hereinafter referred to as "a chromaticity coordinate plane". In this chromaticity coordinate plane, blue is in a fourth quadrant, and its red component increases and thereby blue changes to purple or magenta as the coordinates become closer to the first, quadrant. In a first quadrant, magenta changes to red and then to yellow as the coordinates becomes closer to a second quadrant.

Next at step S1512, the color blur reducer 150 determines whether or not the hue h calculated for the target pixel is a hue regarded as that of the color blur. In other words, the color blur reducer 150 determines whether or not the target, pixel is the color blur pixel. The hue h determined as that of the color-blur is defined by using two hue angles $h_{min}$ and $h_{max}$. When h represents a hue angle of the target pixel, if h satisfies following expression (4):

$$h_{min} \leq h \leq h_{max} \qquad (4),$$

the hue is determined as that of the color blur. Since in the present embodiment, the R and B components are color blur reduction target color components, $h_{min}$ and $h_{max}$ are determined such that the hue angle h covers a range from red through purple to blue. This range from red through purple to blue is roughly represented by a region F enclosed by slanting lines in the chromaticity coordinate plane shown in FIG. 8; $h_{min}$ is −90° and $h_{max}$ is 60° in this description. The region F varies depending on the color component as the color blur reduction target color component and is not necessarily limited to the region defined by the slanting lines. For example, a hue in part of a third quadrant may be regarded as that of the blue blur.

Next at step S1513, the color blur reducer 150 further determines whether or not the target pixel is the color blur pixel. Specifically, the color blur reducer 150 determines that the target pixel (x,y) is the color blur pixel if the intensity of the G component, which is the reference color component, is regarded as being saturated. This is because, if the reference color component is saturated for a high luminance object, the other color components are highly likely to be saturated as well, which indicates that no color blur is generated. "Being saturated" means that, the intensity, which has a value of 0 to 1, of each color component is equal to or greater than a threshold of, for example, approximately 0.9. If determining that the target pixel is not the color blur pixel at this step, the color blur reducer 150 sets a next pixel as the target pixel at steps S106 and S107 without performing the subsequent processes.

If determining that the target pixel is the color blur pixel at steps S1512 and S1513, the color blur reducer 150 determines the hue of the color blur in the color blur pixel at step S1514. The color blur reducer 150 then decides, depending on the hue as a result of the determination, the order of the color components on which the color blur reduction processes are performed. The order is hereinafter referred to as "a color blur reduction order."

At step S1514, the color blur reducer 150 determines whether the color blur has a hue tinged with red or blue. Specifically, the color blur reducer 150 makes the determination by employing a hue $h_p$ of purple which divides a red region and a blue region and by determining whether the hue h of the target pixel is included in the red region or the blue region. The purple hue $h_p$ may be selected as a hue having, at the chromaticity coordinates calculated at step S1511, values of the R and B components are equal to each other under an intermediate luminance. It is desirable that the purple hue $h_p$ is, for example, approximately −30°. However, the purple hue $h_p$ may be empirically determined, and the method of determining the hue $h_p$ is not particularly limited.

The color blur reducer 150 determines that, if the hue h thus determined is within a range shown by following expression (5) in the chromaticity coordinate system:

$$h_{min} \leq h \leq h_P \qquad (5),$$

the color blur has a hue tinged with blue, such as a blue hue or a bluish purple hue, and decides the color blur reduction order so as to perform the color blur reduction process on the B component before the R component.

In contrast, the color blur reducer 150 determines that, if the hue h is within a range shown by following expression (6):

$$h_P \leq h \leq h_{max} \qquad (6),$$

the color blur has a hue tinged with red from a red hue to a reddish purple hue and decides the color blur reduction order so as to perform the color blur reduction process on the R component before the B component. As described above, the color blur reducer 150 in the present embodiment decides the color blur reduction order so as to first perform the color blur reduction process on, among at least two color components whose color blur components (color blurs) form the hue, one having a higher intensity than that of the other.

Next, description will be made of the process to calculate the estimated color blur amounts of the R and B components, that is, to estimate the color blur amounts thereof, which is performed by the color blur reducer 150 at step S104 in FIG. 6. The method of estimating the color blur amount may be a method using an image intensity gradient as follows.

In this method, the image intensity gradients of the R, G and B components, which are respectively represented by $\nabla R$, $\nabla G$ and $\nabla B$, are calculated by following expression (7):

$$\nabla R = \left(\frac{dR}{dx}, \frac{dR}{dy}\right) \equiv \left(\frac{R(x+1, y) - R(x-1, y)}{2}, \frac{R(x, y+1) - R(x, y-1)}{2}\right) \qquad (7)$$

$$\nabla G = \left(\frac{dG}{dx}, \frac{dG}{dy}\right) \equiv \left(\frac{G(x+1, y) - G(x-1, y)}{2}, \frac{G(x, y+1) - G(x, y-1)}{2}\right)$$

$$\nabla B = \left(\frac{dB}{dx}, \frac{dB}{dy}\right) \equiv \left(\frac{B(x+1, y) - B(x-1, y)}{2}, \frac{B(x, y+1) - B(x, y-1)}{2}\right)$$

In above expression (7),
R(x+1,y), G(x+1,y) and B(x+1,y) respectively represent pixel values of the R, G and B components of a pixel located at the right side next to the target pixel;
R (x−1,y), G (x−1,y) and B (x−1,y) respectively represent pixel values of the R, G and B components of a pixel located at the left side next, to the target pixel;
R (x,y+1), G (x,y+1) and B (x,y+1) respectively represent pixel values of the R, G and B components of a pixel located below next to the target pixel; and
R (x,y−1), G (x,y−1) and B (x,y−1) respectively represent pixel values of the R, G and B components of a pixel located above next to the target pixel.

The image intensity gradient may be calculated by other methods such as a method performing calculation in a larger range and a method using a pixel located obliquely to the target pixel.

Next, the color blur reducer 150 calculates the estimated color blur amounts by using the calculated image intensity gradients.

Specifically, as shown in following expression (8), the color blur reducer 150 multiplies absolute values of the image intensity gradients ∇R, ∇G and ∇B of the R, G and B components respectively by coefficients $k_R$, $k_G$ and $k_B$ to calculate the estimated color blur amounts $E_R$, $E_G$ and $E_B$. The coefficients $k_R$, $k_G$ and $k_B$ are positive values and desirably around 3.

$$\begin{cases} E_R = k_R |\nabla R| \\ E_G = k_G |\nabla G| \\ E_B = k_B |\nabla B| \end{cases} \quad (8)$$

In a region where the R and B components are saturated, the image intensity gradients are zero, so that the image intensity gradients when the R and B components are not saturated cannot be obtained. Thus, the image intensity gradients of the R and B components in such a region are calculated from the image intensity gradient of the G component. Only the estimated color blur amount $E_G$ is therefore calculated in expression (8). This estimated color blur amount $E_G$ is used in a later process.

Subsequently, the color blur reducer 150 again determines whether or not the target pixel is the color blur pixel by using the calculated image intensity gradients. Specifically, the color blur reducer 150 determines that, if a ratio of the image intensity gradients of the reference color component and the color blur reduction target color component is equal to or greater than a threshold, the target, pixel is the color blur pixel and the calculated estimated color blur amount is valid. On the other hand, the color blur reducer 150 determines that, if the above ratio is smaller than the threshold, the target pixel is not the color blur pixel and the calculated estimated color blur amount is zero.

When $\alpha_{RG}$ represents the threshold for the ratio of the image intensity gradients of the G and R components, an estimated color blur amount $E_R'$ of the R component after the above determination is given by following expressions (9):

$$E_R' = \begin{cases} E_R & (\nabla R / \nabla G \geq \alpha_{RG}) \\ 0 & (\nabla R / \nabla G < \alpha_{RG}) \end{cases} \quad (9)$$

When $\alpha_{BG}$ represents the threshold of the ratio of the image intensity gradients of the G and B components, an estimated color blur amount $E_B'$ of the B component after the above determination is given by following expressions (10):

$$E_B' = \begin{cases} E_B & (\nabla B / \nabla G \geq \alpha_{BG}) \\ 0 & (\nabla B / \nabla G < \alpha_{BG}) \end{cases} \quad (10)$$

The thresholds $\alpha_{RG}$ and $\alpha_{BG}$ of the ratios of the image intensity gradients are desirably around 2, though they depend on characteristics of the imaging optical system 110.

In addition, the color blur reducer 150 calculates, in order to perform correction based on the image intensity (pixel value), saturation degrees $S_R$ and $S_B$ by performing a non-linear transform on intensities of the R and B components. These saturation degrees $S_R$ and $S_B$ respectively indicate whether or not the R and B components are saturated: $S_R$ and $S_B$ are 1 when the intensities of the R and B components are saturated, whereas $S_R$ and $S_B$ are 0 when the intensities of the R and B components are not saturated. The saturation degrees $S_R$ and $S_B$ may be either of two values of 0 and 1 as described above, but may be a continuous value from 0 to 1 as illustrated in FIG. 9. In this case, the saturation degrees $S_R$ and $S_B$ are given by following expressions (11) and (12):

$$S_R = \begin{cases} 0 & (R \leq 0.5) \\ (R - 0.5)/(0.9 - 0.5) & (0.5 < R < 0.9) \\ 1 & (R \geq 0.9) \end{cases} \quad (11)$$

$$S_B = \begin{cases} 0 & (B \leq 0.5) \\ (B - 0.5)/(0.9 - 0.5) & (0.5 < B < 0.9) \\ 1 & (B \geq 0.9) \end{cases} \quad (12)$$

Then, the color blur reducer 150 decides a new estimated color blur amount $E_R''$ on the basis of the saturation degree $S_R$. That, is, the color blur reducer 150 selects, when the saturation degree $S_R$ is either of the two values of 0 and 1, one of the estimated color blur amounts $E_R'$ and $E_G$ as the new estimated color blur amount $E_R''$ of the R component as shown by following expression (13):

$$E_R'' = \begin{cases} E_R' & (S_R = 0) \\ E_G & (S_R = 1) \end{cases} \quad (13)$$

Alternatively, the color blur reducer 150 sets, when the saturation degree $S_R$ is a continuous value from 0 and 1, the new estimated color blur amount $E_R''$ to a value given by following expression (14):

$$E_R'' = (1 - S_R) E_R' + S_R E_G \quad (14)$$

Similarly, the color blur reducer 150 selects, when the saturation degree $S_B$ is either of two values of 0 and 1, one of the estimated color blur amounts $E_B'$ and $E_G$ as the new estimated color blur amount $E_B''$ of the B component as shown by following expression (15):

$$E_B'' = \begin{cases} E_B' & (S_B = 0) \\ E_G & (S_B = 1) \end{cases} \quad (15)$$

Alternatively, the color blur reducer 150 sets, when the saturation degree $S_B$ is a continuous value from 0 and 1, the new estimated color blur amount. $E_B''$ to a value given by following expression (16):

$$E_B'' = (1 - S_B) E_B' + S_B E_G \quad (16)$$

Thus, when the R and B components are saturated in a region around the high luminance object, and determined as the color blur region, using the estimated color blur amount estimated from the G component enables acquiring the estimated color blur amounts of the R and B components. In addition, using the continuous value expressing the saturation degree enables suppressing abrupt, changes in the estimated color blur amount in the region around the high luminance, object, which achieves a more natural result of the color blur reduction.

The above-described method of calculating the estimated color blur amount using the image intensity gradient is merely an example, and other calculation methods may be employed.

Next, description will be made of the color-blur reduction process performed by the color blur reducer 150 at step S105 in FIG. 6. When the foregoing estimation of the color blur amount gives an excessively large estimated value, a restriction needs to be placed in the color blur reduction process in order to prevent an image including an unnatural color from being produced by the color blur reduction process. This restriction will be described with reference to the chromaticity coordinates (a,b) calculated at step S1511.

Figure 10:
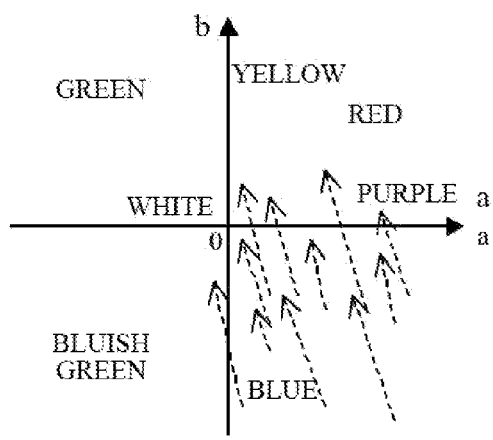
FIG. 10 illustrates a change direction of a B component on the chromaticity coordinate system through the color blur reduction process.

First, when an intensity component corresponding to the estimated color blur amount $E_B''$ of the B component (hereinafter simply referred to as "the estimated color blur amount $E_B''$") is subtracted from the intensity of the B component, chromaticity changes (movements of chromaticity coordinates) in an upper-left direction are caused as illustrated by dotted line arrows in FIG. 10. The starting point of each of the arrows represents a chromaticity before the subtraction of the estimated color blur amount $E_B''$, and the tip of each of the arrows represents a chromaticity after the subtraction thereof. In the chromaticity coordinate system, a region approximately regarded as representing blue is the fourth quadrant as described above. Therefore, if the subtraction of the estimated color-blur amount $E_B''$ causes the chromaticity coordinates to exceed this region, an unnatural color is generated.

For example, an excessive reduction of the B component from a gray background results in a lime green background, which causes a feeling of strangeness to a viewer. For this reason, when the color blur is reduced in the B component, the estimated color blur amount $E_B''$ is desirable to foe restricted (corrected) such that a hue (hue angle) after the color blur reduction is included in the fourth quadrant, that is, in a range of −90° to 0° (hereinafter referred to as "a B hue restriction range) with respect to an a-axis of the chromaticity coordinate system.

Figure 12:
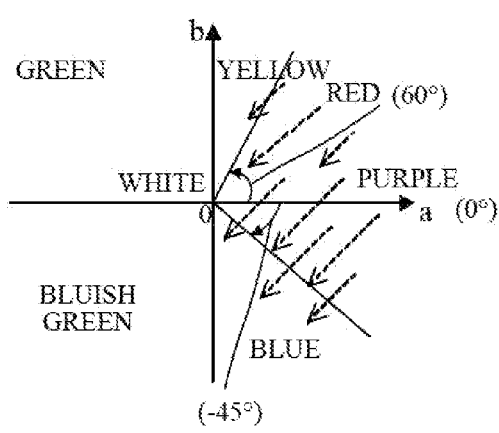
FIG. 12 illustrates a change direction of an R component on the chromaticity coordinate system through the color blur reduction process.

On the other hand, when an intensity component corresponding to the estimated color blur amount $E_R''$ of the R component (hereinafter simply referred to as "the estimated color blur amount $E_R''$") is subtracted from the intensity of the R component, chromaticity changes (movements of chromaticity coordinates) in a lower-left direction are caused as illustrated by dotted line arrows in FIG. 12. In the chromaticity coordinate system, a region approximately regarded as representing red to reddish purple is enclosed by, for example, a straight line forming an angle of 60° with the a-axis and a straight line forming an angle of −45° therewith as illustrated in FIG. 12. Therefore, if the subtraction of the estimated color blur amount $E_R''$ causes the chromatidty coordinates to exceed this region, an unnatural color is also generated. For this reason, when the color blur is reduced in the R component, the estimated color blur amount. $E_R''$ is desirable to be restricted (corrected) such that, a hue (hue angle) after the color-blur reduction is included in a range from −45° to 60° (hereinafter referred to as "an R hue restriction range) with respect to the a-axis.

The hue restriction range may be provided by other methods than the method using the chromaticity coordinates (a,b) as in the present embodiment.

Description will foe made of a specific method of providing the hue restriction range in the color-blur reduction process in the chromaticity coordinate system. When the B hue restriction range is the above-mentioned range from −90° to 0°, the B component can have an intensity in a range expressed by following expression (17):

$$B > 0.22R + 0.68G \char`\^ B > -1.84R + 3.30G \quad (17)$$

Therefore, in order that the hue angle after the color blur reduction be included in the B hue restriction range, a corrected estimated color blur amount. $E_B''$ of the B component needs to satisfy a condition expressed, by following expression (18):

$$E_B''' = \min\{E_B'', B - (0.22R + 0.68G), B - (-1.84R + 3.30G)\} \quad (18)$$

Similarly, when the R hue restriction range is the above-mentioned range from −45° to 60°, the R component can have an intensity in a range expressed by following expression (19):

$$R > 3.19G - 2.01B \char`\^ R > 0.43G + 0.88B \quad (19)$$

Therefore, in order that the hue angle after the color blur reduction be included in the R hue restriction range, a corrected estimated color blur amount $E_R'''$ of the R component needs to satisfy a condition expressed by following expression (20):

$$E_R''' = \min\{E_R'', R - (3.19G - 2.01B), R - (0.43G + 0.88B)\} \quad (20)$$

These corrected estimated color blur amounts $E_B'''$ and $E_R'''$ (in other words, the intensity components corresponding thereto) thus restricted by the hue restriction ranges are respectively subtracted from the original intensities of the B and R components. This restriction enables reduction (desirably, removal) in color blur without causing a change to an unnatural color.

Subtracting the corrected estimated color blur amount $E_B'''$ from the original intensity of the B component gives an intensity B' of the B component after the subtraction as expressed by following expression (21):

$$B' = B - E_B''' \quad (21)$$

Figure 11:
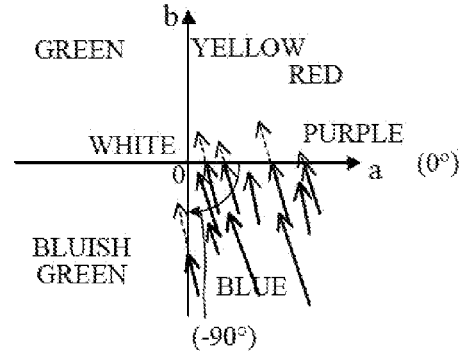
FIG. 11 illustrates a change on the chromaticity coordinate system when a restriction is placed on the color blur reduction process for the B component.

The chromaticity changed by this subtraction is included within the B hue restriction range, which is the range of −90° to 0° and corresponds to the fourth quadrant, as illustrated by solid line arrows in FIG. 11.

Similarly, Subtracting the corrected estimated color blur amount $E_R'''$ from the original intensity of the R component gives an intensity R' of the R component after the subtraction as expressed by following expression (22):

$$R' = R - E_R''' \quad (22)$$

Figure 13:
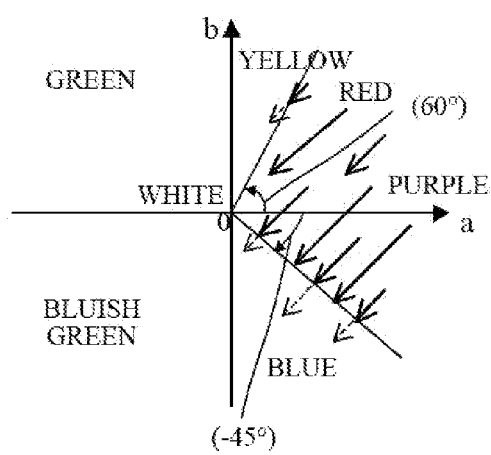
FIG. 13 illustrates a change on the chromaticity coordinate system when a restriction is placed on the color blur reduction process for the R component.

The chromaticity changed by this subtraction is included within the R hue restriction range, which is the range of −45° to 60°, as illustrated by solid line arrows in FIG. 13. With the subtraction of the corrected estimated color blur amounts from the original intensities, the color blur reduction process is completed.

Next, description will be made of a procedure to perform the color blur reduction process in the color blur reduction order determined at step S102. The following description is made of a case of first performing the color blur reduction process on the B component at step S105 and then performing the color blur reduction process on the R component. However, in a case of first performing the color blur reduction process on the R component and then performing the color blur reduction process on the B component, these color blur reduction processes are the same for the respective color components.

In order to perform the color blur reduction process of the B component, the color blur reducer 150 first calculates the corrected estimated color blur amount $E_B'''$ by above expression (18). Next, the color-blur reducer 150 substitutes the calculated corrected estimated color blur amount $E_B'''$ into expression (21) to perform the color blur reduction process of the B component and thereby acquire a blur reduced B component (intensity) B' as the B component after the color blur reduction process.

Subsequently, in order to perform the color blur reduction process of the R component, the color-blur reducer 150 first calculates the corrected estimated color blur amount $E_R'''$ by above expression (20). Next, the color blur reducer 150 substitutes the calculated corrected estimated color blur amount $E_R'''$ into expression (22) to perform the color blur reduction process of the R component and thereby acquire a blur reduced R component (intensity) R' as the R component after the color blur reduction process. In this way, the color blur reducer 150 performs the color blur reduction processes on all the color components of the color image (input image) and then outputs the color image after the color blur reduction processes to the vision corrector 160 illustrated in FIG. 1.

Next, description will be made of a relation between the hue of the target pixel and the color blur reduction order of the R and B components with reference to FIG. 14. The hue (chromaticity) of the target pixel is assumed to be located at a point R in the chromaticity coordinate system. The hue h at the point P, which satisfies $h_{min} \leq h \leq h_p$, represents a color blur in bluish purple. In this case, the color blur reduction process is first performed on the B component, in the present embodiment. Subtracting the estimated color blur amount $E_B''$ directly from the intensity of the B component corresponding to the point P moves the hue to a point $P_B$; however, subtracting therefrom the corrected estimated color blur amount $E_B'''$ corresponding to the hue restriction range stops the move hue at a point $P_B'$. Then, subtracting the corrected estimated color blur amount $E_R'''$ from the intensity of the R component corresponding to the point $P_B'$ moves the hue to a point P'. The point P' is much closer to the origin of the chromaticity coordinate system than the point P.

On the other hand, in a case of performing the color blur reduction process only on the B component, subtracting the corrected estimated color blur amount $E_B'''$ from the intensity of the B component corresponding to the point P moves the hue to a point. $P_B'$ as illustrated in FIG. 15 as well as in FIG. 14. In this case, the point $P_B'$ is located at almost the same distance from the origin of the chromaticity coordinate system as that of the point P, which means that the hue is changed while the chroma remains almost the same. In other words, the color blur changes from bluish purple to magenta. Similarly, in a case of performing the color blur reduction process only on the R component, the hue is moved from the point P to a point $P_R'$, and thereby the color blur changes from bluish purple to blue as illustrated in FIG. 15.

In addition, in a case of performing the color blur reduction processes on the R and B components in parallel (without deciding the color blur reduction order), the hue is moved from the point P in a direction provided by combining the movement directions of the hue when the color blur reduction processes are performed independently on the R and B components in the chromaticity coordinate system. The hue is thus moved from the point P to the point P' as illustrated in FIG. 15. The point P' is slightly closer to the origin than the point P, but the color-blur is not much reduced, and thereby a remaining color blur is noticeable.

Figure 14:
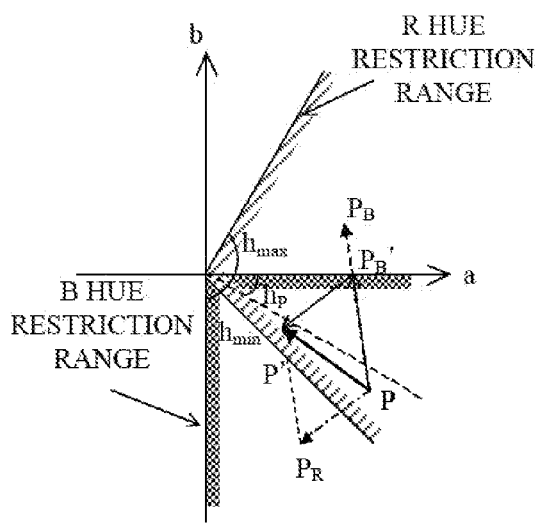
FIG. 14 illustrates a color blur reduction effect in Embodiment 1 on the chromaticity coordinate system.
Figure 15:
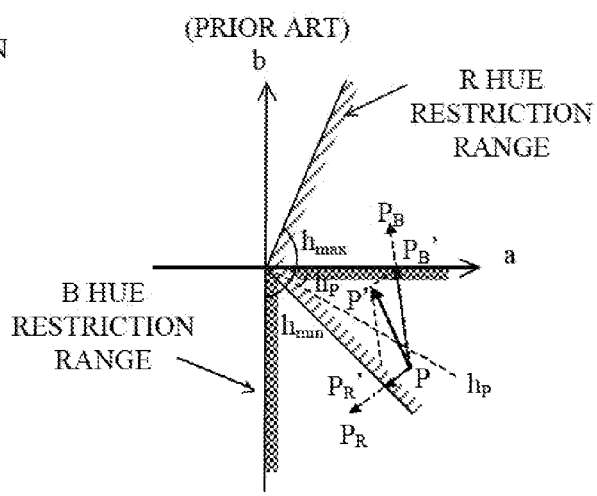
FIG. 15 illustrates a conventional color blur reduction effect on the chromaticity coordinate system.

As understood from comparison between FIGS. 14 and 15, optimizing the color blur reduction order of the color components depending on the hue of the target, pixel (that is, the hue formed by the color blurs of the R and B components at the target pixel) can move the hue (chromaticity) after the color blur reduction process to a point (chromaticity coordinates) sufficiently close to the origin of the chromaticity coordinate system. The hue closer to the origin of the chromaticity coordinate system indicates a color closer to an achromatic color. The present embodiment thus enables a sufficient reduction of a color blur including multiple color components without causing a hue inversion, unlike in a case of performing the color blur reduction process only on part of the color components and in a case of not optimizing the color blur reduction order.

The color blur reduction order to move the hue (chromaticity) after the color blur reduction process as close as possible to the origin of the chromaticity coordinate system can foe also described as follows. The color blur reduction order is an order to perform the color blur reduction process first on, among at least two color components whose color blur components form the hue, one color component whose maximum allowable reduction amount of the color blur (hereinafter referred to as "a maximum color blur reduction amount") is greater than that of each other color component. In the example illustrated n in FIG. 14, the distance from the point. P to the point. $P_B'$ illustrated in FIG. 15 in the direction indicated by the arrows in FIG. 11 is the maximum color blur reduction amount for the B component, and the distance from the point P to the point $P_R'$ in the direction indicated by the arrows in FIG. 12 is the maximum color blur reduction amount for the R component. Since the maximum color blur reduction amount for the B component, is greater than that, for the R component, the color blur reduction order is decided such that the color blur reduction process is first, performed on the B component.

Embodiment 2

Figure 16:
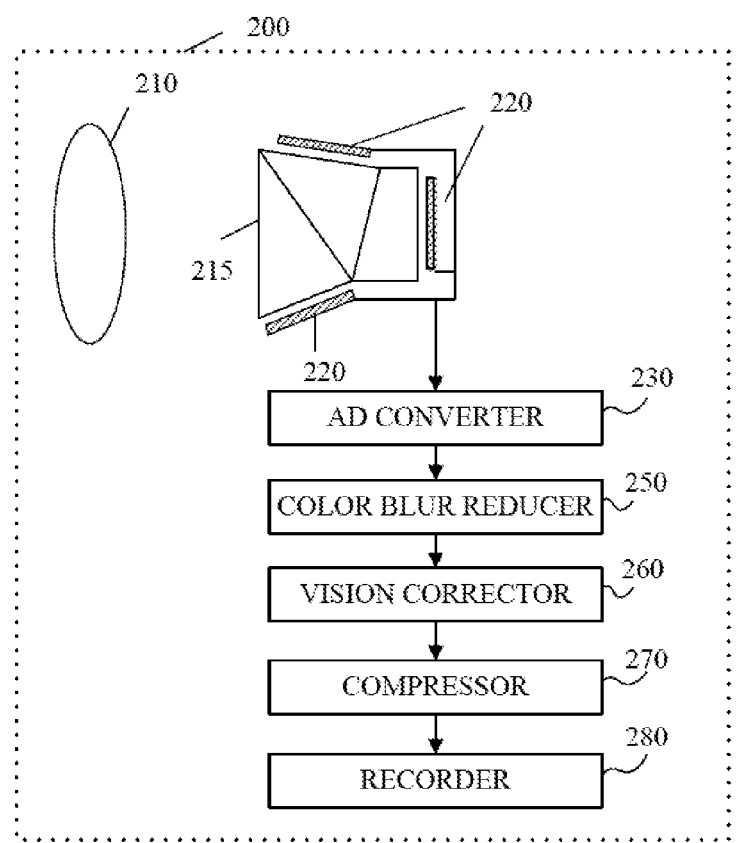
FIG. 16 illustrates a configuration of a color image pickup apparatus provided with an image processing apparatus (and using an image processing method) that is Embodiment 2 of the present invention.

FIG. 16 illustrates a configuration of a color image pickup apparatus 200 provided with an image processing apparatus (that is, using an image processing method) that is a second embodiment (Embodiment 2) of the present invention. The color-image pickup apparatus 200 includes an imaging optical system (image capturing optical system) 210, a color-separation prism 215, image sensors 220, an AD converter 230, a color blur reducer 250, a vision corrector 260, a compressor 270 and a recorder 230. The imaging optical system 210, the color separation prism 215, the image sensor 220 and the AD conversion unit 230 constitute an image pickup system.

Unlike in Embodiment 1, the image sensors 220 in the present embodiment constitute a three-plate image sensor. The color separation prism 215 separates light from the imaging optical system 110 into an R light, a G light and a B light, which are introduced to the corresponding image sensors 220. This configuration does not require the color filters provided to the image sensor 120 and the demosaicer 140 in Embodiment 1.

Similarly to Embodiment 1, the imaging optical system 210 in the present embodiment has a sufficiently corrected chromatic aberration for the G wavelength range, whereas chromatic aberrations for the R and B wavelength ranges remain. The configuration including the three-plate image sensors is capable of correcting the chromatic aberrations by adjusting a position of each image sensor in an optical axis direction; however, since the adjustment thereof is incapable of correcting aberration variation due to a change in zoom position or the like of the imaging optical system 210, such adjustment, is not performed in the present embodiment. Therefore, in the present embodiment, resolutions of the R and B components are inferior to that of the G component, and thereby, in a color image in which the three color components are combined, a color blur that is an artifact like a purple fringe is generated as in Embodiment 1.

The AD converter 230 converts each of an input. Image of the R component, an input image of the G component and an input image of the B component, which are output, as analog voltages from the three image sensors 220, into digital data appropriate for the subsequent image processing.

The color blur reducer 250 serves as the image processing apparatus (including an estimator, a processor and a decider), performs a color blur reduction process to remove the artifact from each of the input images.

The vision corrector 260, the compressor 270 and the recorder 280 respectively have the same functions as those of the vision corrector 160, the compressor 170 and the recorder 180 in Embodiment 1.

Figure 17:
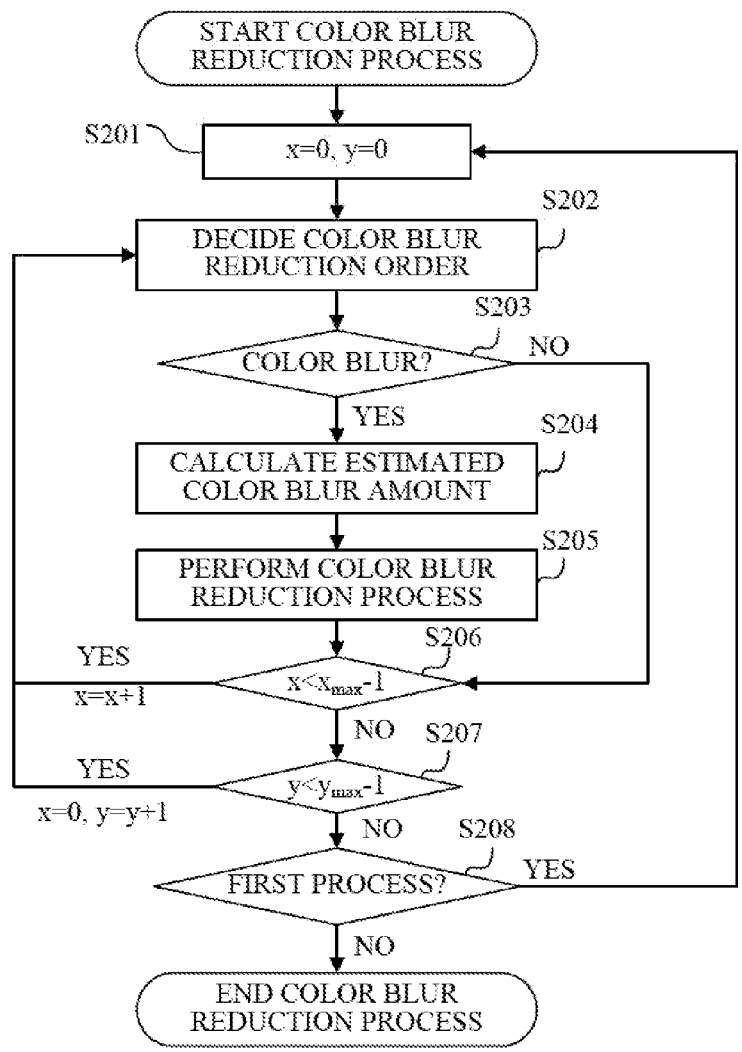
FIG. 17 is a flowchart of a color blur reduction process in Embodiment 2.

In the color image pickup apparatus 200 thus configured, the color blur reducer 250 as a computer performs processes illustrated in a flowchart of FIG. 17 according to a computer program (image processing program). In the present embodiment, as well as in Embodiment 1, the color blur reducer 250 treats the R and B components as the targets of the color blur reduction process (in other words, the color blur reduction target color components) and uses the G component as the reference color component.

First at step S201, the color blur reducer 250 acquires the input images of the G, R and B components from the AD converter 230 to provide the input images as process target images. The color blur reducer 250 then sets coordinates (x,y) of first target pixels on which a determination of whether or not the color blur reduction process is performed in the input images is made to (0,0). The target pixels are mutually corresponding pixels in the input images of the G, R and B components.

Subsequently at step S202, the color blur reducer 250 determines a hue from intensities (pixel values) of the mutually corresponding target pixels in the input images. As well as in Embodiment 1, the color blur reducer 250 then decides, depending on the determined hue, the order (color blur reduction order) of the R and B components on which the color blur reduction processes are performed.

Next at step S203, the color blur reducer 250 determines whether or not a combined target pixel as a combination of the target pixels is a color blur pixel having a color peculiar to the color blur. If the combined target pixel is not the color blur pixel, the color blur reducer 250 proceeds to step S206. If the combined target pixel is the color blur pixel, the color blur reducer 250 proceeds to step S204.

At step S204, the color blur reducer 250 calculates, in the color blur pixel, an estimated color blur amount of one color component whose color blur reduction order is the first among the color blur reduction target color components (R and B components). That is, the color blur reducer 250 calculates the estimated color blur amount of each color component. The method of calculating the estimated color blur amount may be the method using the image intensity gradient as in Embodiment 1, and other methods may also be employed.

At step S205, the color blur reducer 250 performs, using the estimated color blur amount calculated at step S204, the color blur reduction process to reduce (desirably, to remove) a color blur component of each color component in the color blur-pixel. In this process, as well as in Embodiment 1, a hue restriction range is provided to prevent an excessive color blur reduction process.

At steps S206 and S207, the color blur-reducer 250 repeats the processes at steps S202 to S205 for all the pixels in the input image with changing x and y coordinates of the combined target pixel.

Subsequently at step S208, the color blur reducer 250 determines whether or not a first color blur reduction process has been performed at step S205. If so, the color blur reducer 250 returns to step S201 to repeat the processes at steps S202 to S207. A second color blur reduction process is performed on the image after the first color blur reduction process.

In the present embodiment, when the color-blur reduction process is determined to be performed first on the B component in a pixel having color blurs of both of the R and B components, the color blur of the R component remains in an image whose color blur of the B component was reduced by the first color blur reduction process and which is provided for the second color blur reduction process. The second color blur reduction process reduces the color blur of the R component to produce an image whose color blurs of the R and B components were reduced. In a case where a color blur is included only in one of the R and B components, the color blur determination process at step S203 to the color blur reduction process at step S205 for the other color component is skipped, so that, only the color blur reduction process for the one color component (that is, for a single color) is performed. In this case, a second estimation process to calculate the estimated color blur amount reduction is unnecessary, which enables reducing a calculation cost.

After thus acquiring an output image whose color blur components of the R and 3 components were reduced, the color blur reducer 250 sends the output image to the vision corrector 260.

The present embodiment repeats the calculation of the estimated color blur amount at step S204 and the color blur reduction process at step S205 for a set of the mutually corresponding target pixels of the different color components. Therefore, the present embodiment is applicable to a case of including a color blur of a single color by virtually not performing the color blur reduction process on either of the color components.

Embodiment 3

Although Embodiments 1 and 2 each described the image pickup apparatus using the image processing method (provided with the image processing apparatus), the image processing method may be also implemented by an image processing program as a computer program installed in a personal computer. In this case, the personal computer corresponds to the image processing apparatus.

Figure 18:
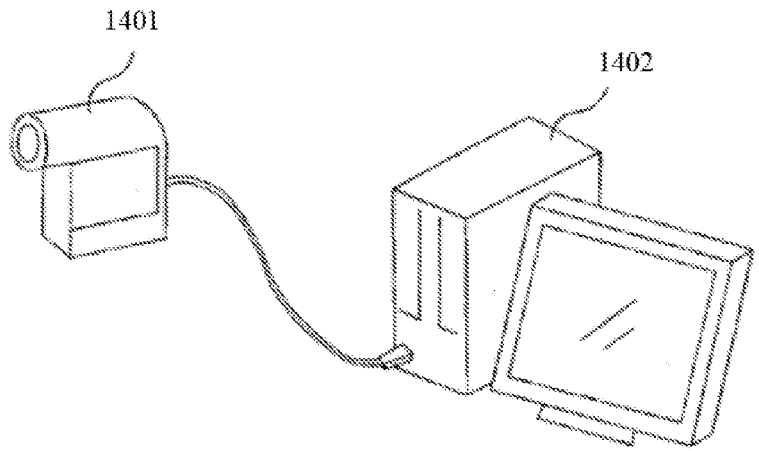
FIG. 18 illustrates an image processing apparatus that is Embodiment 3 of the present invention.

As illustrated in FIG. 18, a personal computer 1402 takes in an image (input image) which is produced by a color image pickup apparatus 1401 and on which the color blur reduction process is not performed, through cable communication, wireless communication or a recording medium such as a semiconductor memory and an optical disk. The personal computer 1402 operates according to the image processing program to determine the color blur reduction order, calculate the estimated color blur amount and then perform the color blur reduction process, as in Embodiments 1 and 2, and to output a resulting image.

Each of the embodiments decides the order of the multiple color components on which the color blur reduction processes are performed depending on the hue of the color blur including at least two color components, thereby sufficiently reducing the color blur without causing the hue inversion.

Other Embodiments

Embodiments of the present invention can also be realised by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a Random-access memory (RAM), a read only memory (ROM), a storage of distributed computing systems, an optical disk (such as a compact disc (CD), digital versatile disc (DVD), or Blu-ray Disc (BD)™)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent. Application No. 2013-132660, filed Jun. 25, 2013, which is hereby incorporated by reference herein in their entirety.

What is claimed is:

1. An image processing apparatus comprising:
an estimator configured to estimate an amount of a color blur of each of multiple color components included in a color image;
a processor configured to perform a color blur reduction process to reduce, from the color image, the color blur of each color component by using the estimated amount of the color blur thereof; and
a decider configured to acquire a hue formed by the color blurs of the color components and to decide, depending on the hue, an order of the color components on which the color blur reduction processes are performed.

2. An image processing apparatus according to claim 1, wherein the decider is configured to decide the order such that the color blur reduction process is first performed on, among at least two color components whose color blurs form the hue, one color component whose intensity is greater than that of each other color component.

3. An image processing apparatus according to claim 1, wherein the decider is configured to decide the order such that the color blur reduction process is first, performed on, among at least two color components whose color blurs form the hue, one color component whose maximum allowable reduction amount of the color blur is greater than that of each other color component.

4. An image processing apparatus according to claim 1, wherein the color image includes, as the multiple color components, a red component, a green component and a blue component, and the processor is configured to perform the color blur reduction processes on the red and blue components.

5. An image pickup apparatus comprising:
an image producer configured to produce a color image by image capturing; and
an image processing apparatus comprising:
an estimator configured to estimate an amount of a color blur of each of multiple color components included in the color image;
a processor configured to perform a color-blur reduction process to reduce, from the color image, the color blur of each color component by using the estimated amount of the color blur thereof; and
a decider configured to acquire a hue formed by the color blurs of the color components and to decide, depending on the hue, an order of the color components on which the color blur reduction processes are performed.

6. An image processing method comprising:
providing a color image including multiple color components;
estimating an amount of a color blur of each of the color components in the color image;
performing a color blur reduction process to reduce, from the color image, the color blur of each color component by using the estimated amount of the color blur thereof;
acquiring a hue formed by the color blurs of the color components; and
deciding, depending on the hue, an order of the color components on which the color blur reduction processes are performed.

7. A non-transitory computer-readable storage medium storing a computer program that causes a computer to perform image processing comprising:
providing a color image including multiple color components;
estimating an amount of a color: blur of each of the color components in the color image;
performing a color blur reduction process to reduce, from the color image, the color blur of each color component by using the estimated amount of the color blur thereof;
acquiring a hue formed by the color blurs of the color components; and
deciding, depending on the hue, an order of the color components on which the color blur reduction processes are performed.

* * * * *